R. B. SAALFRANK 2,841,991

STROKE ADJUSTMENT DEVICE

Filed April 16, 1956

July 8, 1958  R. B. SAALFRANK  2,841,991
STROKE ADJUSTMENT DEVICE
Filed April 16, 1956  6 Sheets-Sheet 5

United States Patent Office 2,841,991
Patented July 8, 1958

2,841,991

STROKE ADJUSTMENT DEVICE

Royal Bartlett Saalfrank, Gulfport, Fla., assignor to Milton Roy Company, Philadelphia, Pa., a corporation of Pennsylvania Application April 16, 1956, Serial No. 578,503

17 Claims. (Cl. 74—40)

This invention relates to variable stroke mechanisms of the type particularly useful in the operation of pumps of the controlled volume type and has for an object the provision of a mechanism which is rugged, reliable, and yet is simple in concept and of low manufacturing cost.

In my Patent No. 2,640,425 there is described a stroke adjusting device by which there is achieved a linear relationship between the amount of adjustment and the resultant change in stroke, together with provisions for maintaining the forward end of the stroke at substantially the same point for all stroke lengths. While the mechanism described in my aforesaid patent has been satisfactory and particularly well adapted to controlled volume pumps of large capacity and high discharge pressures, something was left to be desired in a mechanism of simpler design and yet which not only retains the features and advantages of the mechanism as described in my said patent, but also represents improvements.

In carrying out the present invention in one form thereof, a crosshead is arranged to be reciprocated along a given travel path. The crosshead may be formed integrally with a plunger movable within a plunger chamber. Extending through a bearing member pivotally mounted at the end of the crosshead is a rod carried by a swing member which with the rod is bodily adjustable relative to the bearing member carried by the crosshead. The bearing member is purposely made of somewhat softer material than the rod and crosshead so that any wear preferentially occurs on the bearing member. It is designed as an easily replaceable unit which is simply renewed when the wear becomes excessive.

A supporting structure is provided for the swing member which not only provides a stroke-adjusting movement of a pivotal connection adjacent one end thereof, but which also constrains the line of travel of the pivotal connection along a path inclined at an angle from the travel path of the crosshead. Near the opposite end of the swing member, a driving link is pivotally attached to it and by means of a crank or eccentric the swing member is swung to and fro for driving the crosshead back and forth along its travel path.

The stroke or movement of the crosshead and plunger can be varied from zero to a maximum by movement of the stroke-adjusting pivotal connection of the swing member and drive rod along said inclined path. A linear relationship is established between movement of the pivotal connection of the swing member along its inclined path and the related change in stroke of the crosshead. Moreover, the change in stroke is substantially entirely due to a change in the extent of rearward movement of the crosshead, the forward end of the plunger for the maximum forward stroke occupying substantially the same position over the full range from zero stroke to maximum stroke. From a practical standpoint, any slight deviation in position of the end of the plunger from the same forward position is inconsequential.

For further objects and advantages of the invention and for a more detailed understanding thereof, reference is to be had to the following description taken in conjunction with the accompanying drawings, in which.

Figures 1, 2:
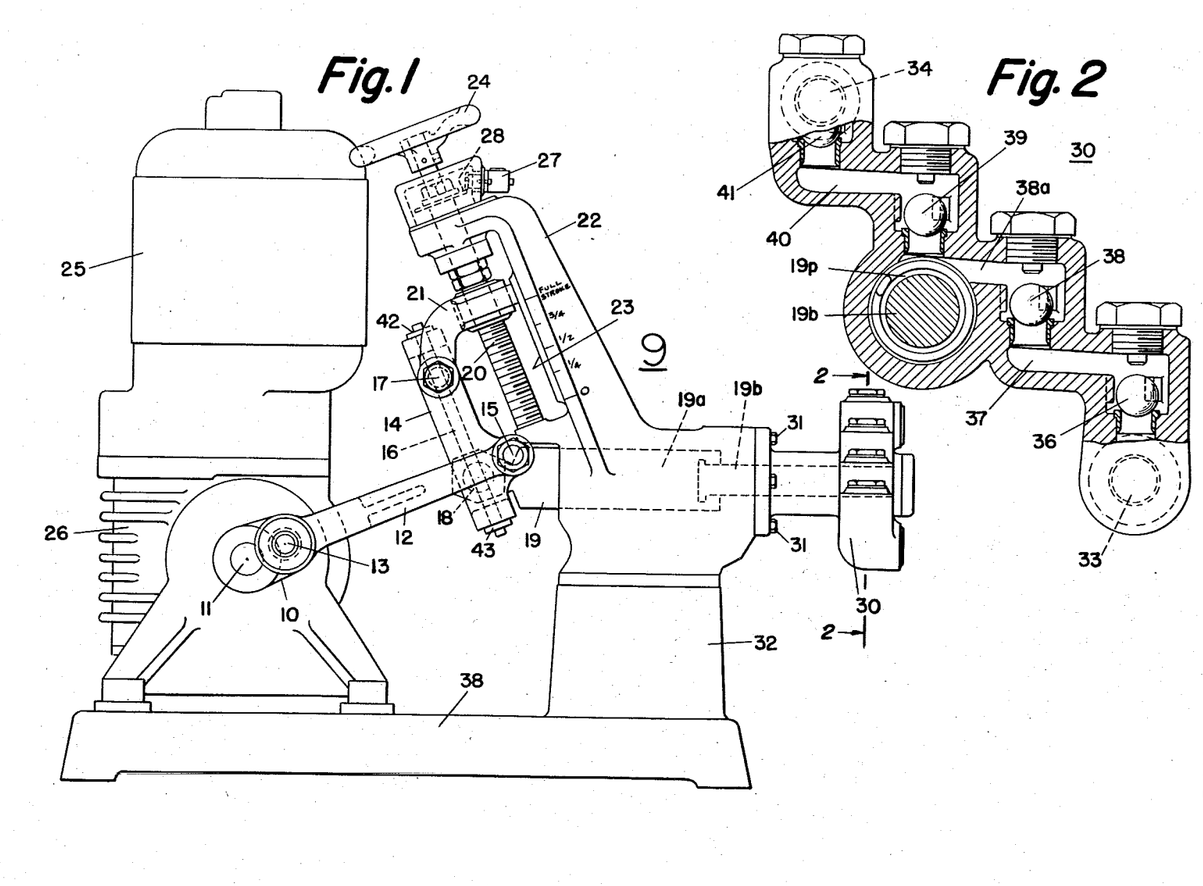
Fig. 1 is a side elevation of a variable stroke mechanism as applied to a controlled volume pump.
Fig. 2 is a section taken on the line 2—2 of Fig. 1.

Referring now to the drawings, the invention in one form has been shown as applied to a controlled volume pump 9 having an operating and stroke-adjusting arrangement which includes a crank arm 10 rotatable about the axis of a drive shaft 11 and having pivotally connected thereto an actuating link 12 as by a pin-type of bearing 13. The driving link 12 has a bifurcated end which, as clearly appears in Fig. 3, straddles a swing member 14. The link 12 is pivoted to member 14 by a pair of pivot pins 15, only one of which appears in the drawings. The swing member or swing box 14 is illustrated, Fig. 3, in the form of an open rectangular frame having secured between the upper and lower ends thereof a swing or drive rod 16. The swing member 14 is pivoted for rotation about the axis of a pair of pivot pins 17, only one of them appearing in the drawings. The swing rod 16 extends through a cylindrical opening of an easily replaceable cylindrical bearing member 18, Figs. 4 and 5, rotatably carried by the bifurcated end of a crosshead or plunger 19. The rod 16 and bearing member 18 serve as the driving connection to the plunger.

Figures 3, 4, 5:
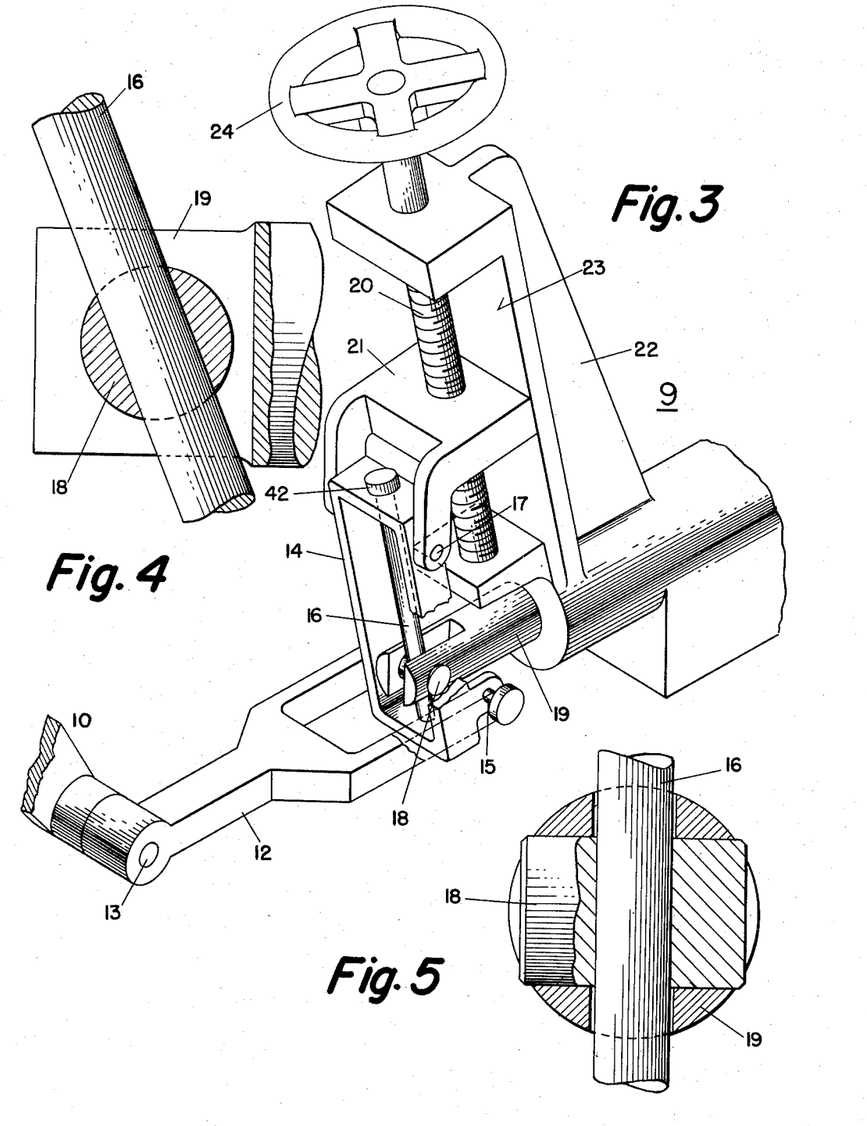
Fig. 3 is a perspective view of the stroke-adjusting mechanism of Fig. 1.
Fig. 4 is a fractional sectional view of the end of the plunger or crosshead of Figs. 1 and 3.
Fig. 5 is a transverse section of the end of the crosshead at the location of the drive rod of the swing member.

The length of stroke of plunger 19 is readily adjustable at all times by bodily moving the swing box 14 and the rod 16 to change the relative lengths of the lever arms which produce reciprocation of plunger 19, i. e., the relative lengths of rod 16 above and below bearing member 18. It will be observed that the assembly including the swing member 14, together with the swing rod 16, is bodily adjustable upon rotation of a screw 20 extending through the threaded opening of a supporting structure 21 provided for the upper end of swing member 14. Rotation of the supporting structure 21 is prevented by its slidable engagement with the flat face 23 of a bracket 22 extending upwardly from the frame or main casting. Thus, by rotating handwheel 24 the supporting structure 21 may be raised or lowered to move the swing box 14. When it is lowered, the swing rod 16 is moved downwardly relative to the bearing member 18 carried by the bifurcated end of the plunger 19.

While the assembly including the swing member 14 may be reciprocated by any suitable mechanism, a motor 25, Fig. 1, through a gear reduction assembly 26 drives the shaft 11 to which there is secured the crank 10. Thus rotation of the crank arm 10 through its pivotal connection 13 with the driving link 12 moves the swing member 14 and rod 16 to and fro about the pivotal axis established by pivot pins 17. During this movement the plunger 19 is driven by rod 16 and bearing member 18 from a substantially constant forward position to a rearward position determined by the setting of the handwheel 24. A revolution counter 27 is driven through gearing 28 by the wheel 24. Since the length of stroke bears a linear relationship, linear for all practical purposes, to the position of supporting structure 21, any suitable revolution counter, such as the Veeder Root type illustrated, provides for an indication which is proportional to the output of the pump per stroke.

While not necessary to the stroke-adjusting mechanism, I prefer in a controlled volume pump to utilize the ball valve assembly 30 described and claimed in my copending application Serial No. 471,623, filed November 29, 1954. Briefly, there is combined with that assembly a plunger chamber 19p into which the plunger 19 extends. The valve assembly 30 as shown in Figs. 1 and 2 is disposed at 90° to the axis of the plunger chamber and the assembly as a whole is secured as by bolts 31 to the main casting which can be separate from, or part of, a supporting base 32 on which the gear reduction box 26 and the motor 25 are carried. The inlet connection to the valve assembly 30 is by way of a conduit or pipe opening 33, Fig. 2, which communicates with a first ball valve 36.

The controlled volume pump 9 is designed primarily to meter or accurately to predetermine the amount of liquid to be delivered into an outlet pipe 34 for each stroke of the plunger 19. Preferably, a net positive head of liquid is maintained upon the inlet connection 33. Accordingly, as the plunger 19 is moved from its forward position toward the rearward position, liquid flows into the passage 33 and through a pair of ball valves 36 and 38 into the plunger chamber 19p. A flow passage 37 interconnects the discharge side of ball valve 36 and the inlet side of valve 38. A second flow passage 38a extends from the discharge side of ball valve 38 to the plunger chamber. The plunger chamber 19p is at all times fully filled with liquid to be delivered in measured flow to the outlet pipe 34.

After the plunger reaches its rearward position and as forward movement begins, the ball valves 36 and 38 close and a pair of ball valves 39 and 41 open. These ball valves open by the displacement of liquid from the plunger chamber by reason of the movement of plunger 19b into it. There is thus delivered by way of ball valve 39, a flow channel 40, and a ball valve 41, a volume of liquid equal to the change in volume which takes place within the plunger chamber as the result of the reciprocation of plunger 19.

With the pump operating in the foregoing manner, the length of stroke can be adjusted during continued operation and at any time by adjusting rotating wheel 24 to re-position the supporting structure 21 between its illustrated full stroke position and any fractional part thereof. The arrangement provides a range of adjustment, as indicated on the scale on bracket 22, from full stroke to zero stroke.

For the different stroke adjustments, the rod 16 will occupy different positions in respect to the bearing member 18. This member, as best shown in Figs. 3–5, extends through the arms at the end of the plunger or crosshead 19. While additional bearing means may be provided, it is contemplated that the insert or bearing member 18 will be made of bronze or other suitable bearing material. Its diameter will be adequately large to reduce the bearing pressures to safe loading values and, therefore, may itself form its own rotatry bearing by relative rotation within the openings provided in the bifurcated end of plunger 19. Similarly, the cylindrical opening through the bearing member 18 provides the bearing surface for the rod 16 which not only slides therethrough during adjustment for stroke but also affords a relative low friction connection for a certain amount of relative movement between rod 16 and bearing member 18 during normal operation of the pump 9.

The simplicity of the bearing member 18 and the manner in which it performs its many functions in the pump greatly contributes to long life of the pump and to service-free operation thereof besides providing a low-cost replacement part. As soon as noticeable wear appears, the bearing member 18 as a whole is readily replaced by loosening nuts 42 and 43, Fig. 1, for removal of rod 16. This rod need only be moved along its axis until free of the bearing member 18 which can then be moved along its axis until free of the bifurcated end of plunger 19. The described operation takes but a few minutes to replace the bearing member 18 and to restore the pump 9 to operation free from play between the rod 16 and plunger 19.

The manner in which the forward position of the plunger 19 is maintained substantially constant will now be described. Before doing so, however, it may be observed from Fig. 1 that while the plunger 19 may include the bifurcated end, there may be separation of the plunger-assembly into two parts. The enlarged part shown at 19a may comprise a part of the crosshead. The plunger 19b may then be connected to the crosshead 19a as by a T-shaped slot. The particular construction utilized for the crosshead and/or plunger may be varied as described and forms no part of the present invention.

Figure 6:
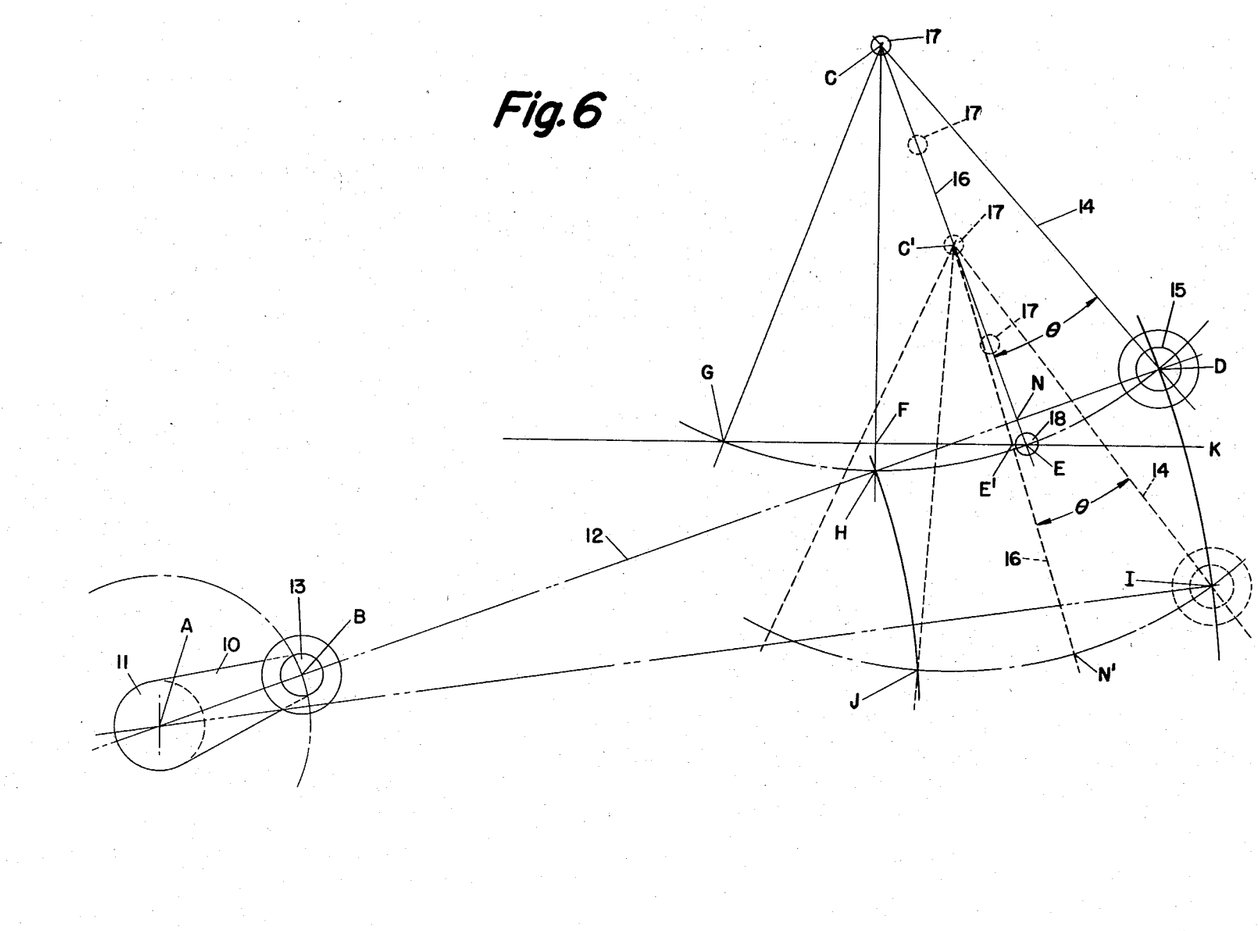
Fig. 6 is a geometrical representation of the stroke-adjusting mechanism of the modification of Figs. 1–5 illustrating the change of the stroke which occurs with the drive rod in the full stroke position and at a position intermediate full stroke.

Referring now to Fig. 6, there will be presented an analysis of the features of the invention contributing to the stroke adjustment by means of which the forward end of the plunger always attains the same forward position (to a close approximation) at the end of each stroke regardless of the length thereof. The analysis presented in connection with Fig. 6 will also be of assistance in understanding some of the variations of the invention later to be described. The various points in Fig. 6 have been identified by letters with the reference numerals applying to the same parts as in Figs. 1–5. Thus, the line AB represents the length of the crank arm. That crank arm is shown in the position in which the axis or centerline of link 12 is defined by the line AD, the forward end of the link being attached at the pivotal connection 15. The kinematic link between the pivotal connections 17 and 15 (between C and D) is identified in Fig. 6 as 14 and is represented by the line between C and D. Similarly, the kinematic link between the pivotal connections 17 and 18 (between C and E) is identified in Fig. 6 as 16 and is represented by the line between C and E. Point E identifies the axis of the pivotal connection of the bearing member 18 with the bifurcated end of the crosshead or plunger 19. The crosshead and plunger are moved along the path EG of the line GK. As the crank arm 10 is rotated, point D moves along the arc DEHG and when it arrives at the point H, the plunger will have been moved from its forward position at E to its rearward position at G. The length of stroke is equal to the distance EG.

It is to be observed that the drive rod 16 moves from the position of line CE to the position of line CG. It is to be further observed that the axis of rotation at A for the crank arm 10 lies on the line AD. The line AD extends at right angles to the line CE, which line defines the forward position of the rod 16 at full stroke of the controlled volume pump. The length of the link 12 is selected for particular applications of the pump and in respect to design considerations and in view of its effect upon constancy of the forward position of the plunger for stroke adjustments other than full stroke. As will later be pointed out, other factors remaining the same, the greater the length of the link 12, the greater will be the constancy in said forward position of the plunger.

In connection with Fig. 6, it is emphasized that the path of adjustment of the pivotal connection 17 is coincident with the line CE extending through the axes of the pivotal members or connections 17 and 18 with the rod 16 in its forward position for full stroke of the pump.

As the pivotal connection 17 is moved downwardly along the line CE, the length of stroke will be progressively decreased. The positions for ¾, ½ and ¼ stroke have been marked with pivot 17 appearing as broken-line circles. At the ½ stroke position the point C has moved to C' along the line CE, and the crank arm 10 and link 12 now extend along the line AI. The arc DI represents the path of the point D, coinciding with the axis of pivotal connection 15, as the stroke length is shortened from full stroke to ½ stroke. The arc DI has a radius equal to AD. With the crank arm 10 rotating, the kinematic link 14, now between C' and I, moves between the forward position C'I and the rearward position defined by the line C'J. Since the angle DCE does not change (it is the angle extending between the lines interconnecting the centers of pivotal connections 15, 17 and 18), the position of the line C'N' defining the rod 16 is at the same angle θ to C'I as CE was to CD in the full stroke position. Thus, the line C'N' shows the forward position of the member 16 at ½ stroke. Since the line C'N' intersects the travel path GK of the crosshead at E', it will be seen that at ½ stroke there is a slight deviation in the plunger position from the position it had in the forward position at full stroke. This deviation, represented by the spacing between E and E', is quite small compared with the length of the full stroke. With a full stroke of three inches and a ½ stroke of one and one-half inches, the deviation will be of the order of one-eighth inch. The deviation is less for both shorter and greater stroke lengths than ½ stroke and the deviation is zero at both full stroke and zero stroke. As the stroke decreases from ½ stroke, the deviation decreases with zero as a limit at zero stroke, since at zero stroke the axis of pivotal connection 17 coincides with the axis of pivotal connection 18 at the position of point E.

It is to be further noted that for full stroke the best pressure angles are obtained since the line of action BD of link 12 is normal to the kinematic link CE or rod 16 as the forward stroke is completed. There is deviation from this desirable pressure angle as the stroke is shortened. On the other hand, as the stroke is shortened, a mechanical advantage appears. As the pivotal connection 17 is moved downwardly to the ½ stroke position, the lever arm C'E' is decreased to about half its length at full stroke approximately to double the mechanical advantage. Thus, as the pressure angles grow more unfavorable, the mechanical advantage increases for development of adequate forces on the plunger to move it forward for every stroke length less than full stroke against the same pressures for which it is operative at full stroke and without material change of the torque requirements on the crank 10 and motor 25.

If it be desired to decrease the distance E—E', this may be readily done by merely lengthening the link 12 and locating the center of rotation A of the crank arm 10 a further distance from the point D. Since clearance must be provided for movable parts of any mechanism, and inasmuch as other variations account for deviations in output of the pump, deviations of the order of one-eighth inch or less, for a stroke of one and one-half to three inches, are inconsequential in most applications of controlled volume pumps. Nevertheless, if it be desired to decrease by 50% the deviation E—E' as between full stroke and ½ stroke, it may be readily done without increasing the length of the link 12. Such an arrangement is diagrammatically shown in Fig. 7.

Figure 7:
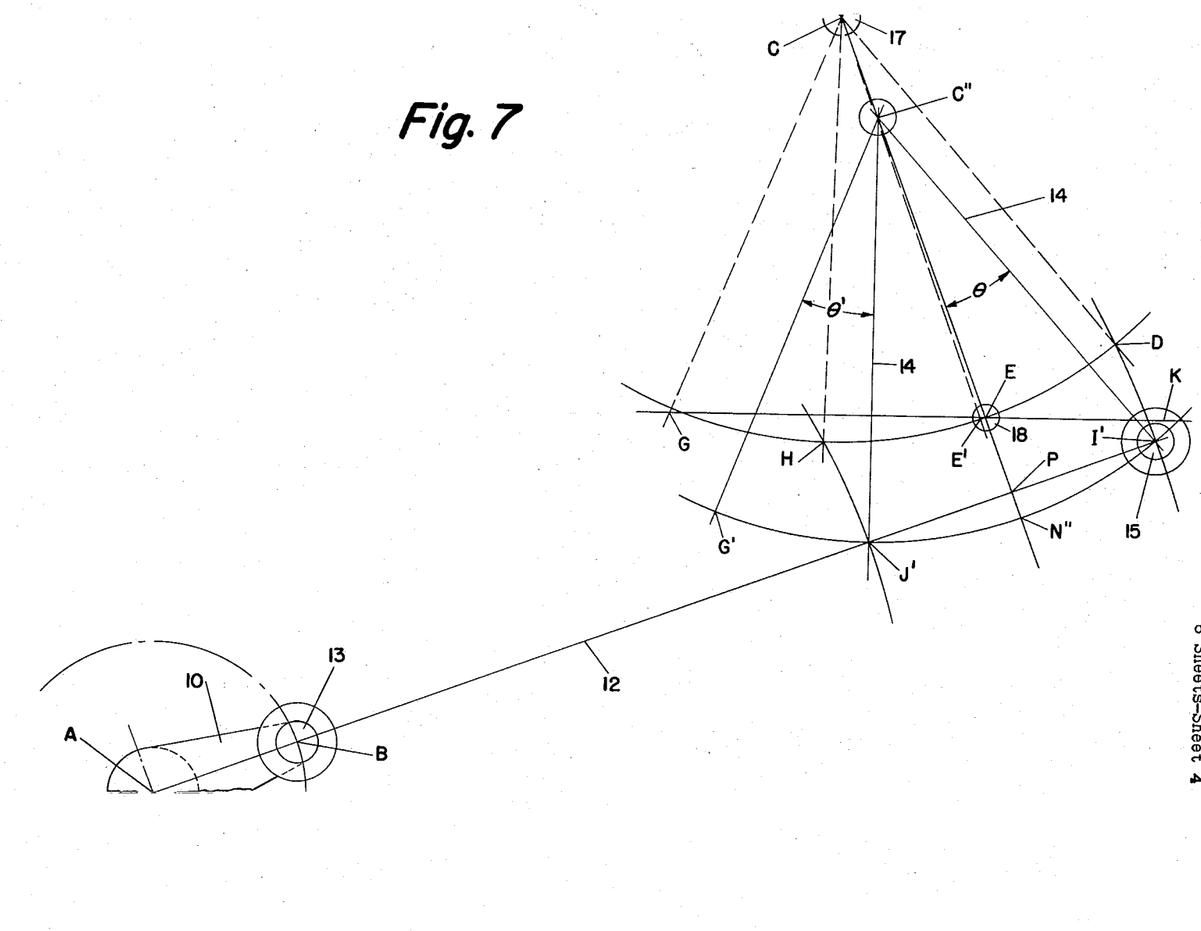
Fig. 7 is a geometrical diagram of an embodiment of the invention corresponding with Fig. 6 but illustrating the manner in which the maximum forward position of the plunger is attained for a selected position of the adjusting mechanism between zero stroke and full stroke.

In Fig. 7 the points C, E and D are identical with those in Fig. 6, and there are also established the same travel paths CE and GK for the pivotal connections 17 and 18. The difference in the construction of the pump of Fig. 7 relative to the pump of Fig. 6 is as follows. Where in Fig. 6 the forward position of the plunger is the same in the full stroke position and at zero stroke with maximum deviation in the forward position occuring intermediate full stroke and zero stroke, in Fig. 7 the said deviation at half stroke is greatly reduced. This is accomplished by splitting, approximately, the deviation of Fig. 6 at half stroke between the full stroke and half stroke positions. In brief, this is done by a construction in which there is zero deviation of the plunger at three-fourths stroke and zero stroke, and at all other stroke lengths there is negligible deviation from the maximum forward position of the plunger. The manner in which the foregoing arrangement of Fig. 7 is accomplished will now be set forth in terms of the steps needed to establish the proper design of the mechanism.

With the distance CE used as a radius and the point C" at the position of ¾ stroke used for the origin, the arc I"N"J'G' is drawn. The present design is to have zero deviation of the plunger in the forward position at ¾ stroke. Therefore, the kinematic link between the pivotal connections 17 and 18 will coincide with the line of adjustment of connection 17 along the path defined between line CE. Inasmuch as the kinematic link C"I' is always at the same angle θ from the line CEPN", the line C"I' may be drawn. From the point I', where C"I' intersects the arc G'J'N"I', there is erected a line I'PJ'BA normal to the line C"EN". On the foregoing line I'PJ'BA will be a newly established position for the axis A of the crank arm 10. Since the length I'B of the link 12 and the radius BA of the crank arm 10 are to remain the same as in Fig. 6, the point A will be determined by striking an arc from the point I', with a radius equal to I'B plus BA. Its point of intersection with the foregoing line establishes the point A. Now using A as a center for an arc with a radius of length equal to the distance AI', the arc I'D may be drawn. By using a radius from A equal to AI" minus 2AB, a second arc J'H may be drawn. The length 2AB is equal to the diameter of the circle described by the pivotal connection 13 of the crank 10. The point J' is established at the intersection of the arc J'H with the arc I'N"J'G'. The line C"J' defines the position of the link 14 for the rearward position of the plunger. When the kinematic link 14 is rotated about C" from C"I' to C"J', the kinematic link C"N" moves to its new position C"G'. The angle θ' is equal to θ by reason of the construction of the swing box including link 14.

The manner in which the point A is determined for the design of Fig. 7 has now been shown. The position of the parts likewise demonstrates that at ¾ stroke, the forward position of the plunger, with ink 12 normal to kinematic link C"P, occurs with the connection 18 at location E. As the stroke is varied in either direction from three-fourths full stroke, there will be a slight movement of connection 18 and of the plunger in the negative direction or toward E'.

The positions of the parts for the full stroke position have been illustrated by broken lines. It will be observed that the deviation EE' has been decreased at least 50% from that appearing in Fig. 6. It is to be further noted that at ½ stroke and at ¼ stroke the deviation will not exceed that at full stroke.

While Fig. 7 is to be taken as illustrative of the principles of many modifications of the invention which may be made within the scope of the appended claims, other variations in the design further demonstrate the flexibility and adaptability of the stroke-adjusting means to widely differing requirements. Suppose for example, a stroke-adjusting mechanism is desired for a plunger or crosshead whose maximum displacement will be materially less than the mechanism of Fig. 6 and Fig. 7, for example, two inches instead of three inches, and whose deviation from complete scavenging (the deviation from the same forward position of the plunger from zero to full stroke) shall not exceed that of the mechanism of Fig. 7. Such a mechanism, embodying the present invention, may be designed as follows.

Figure 8:
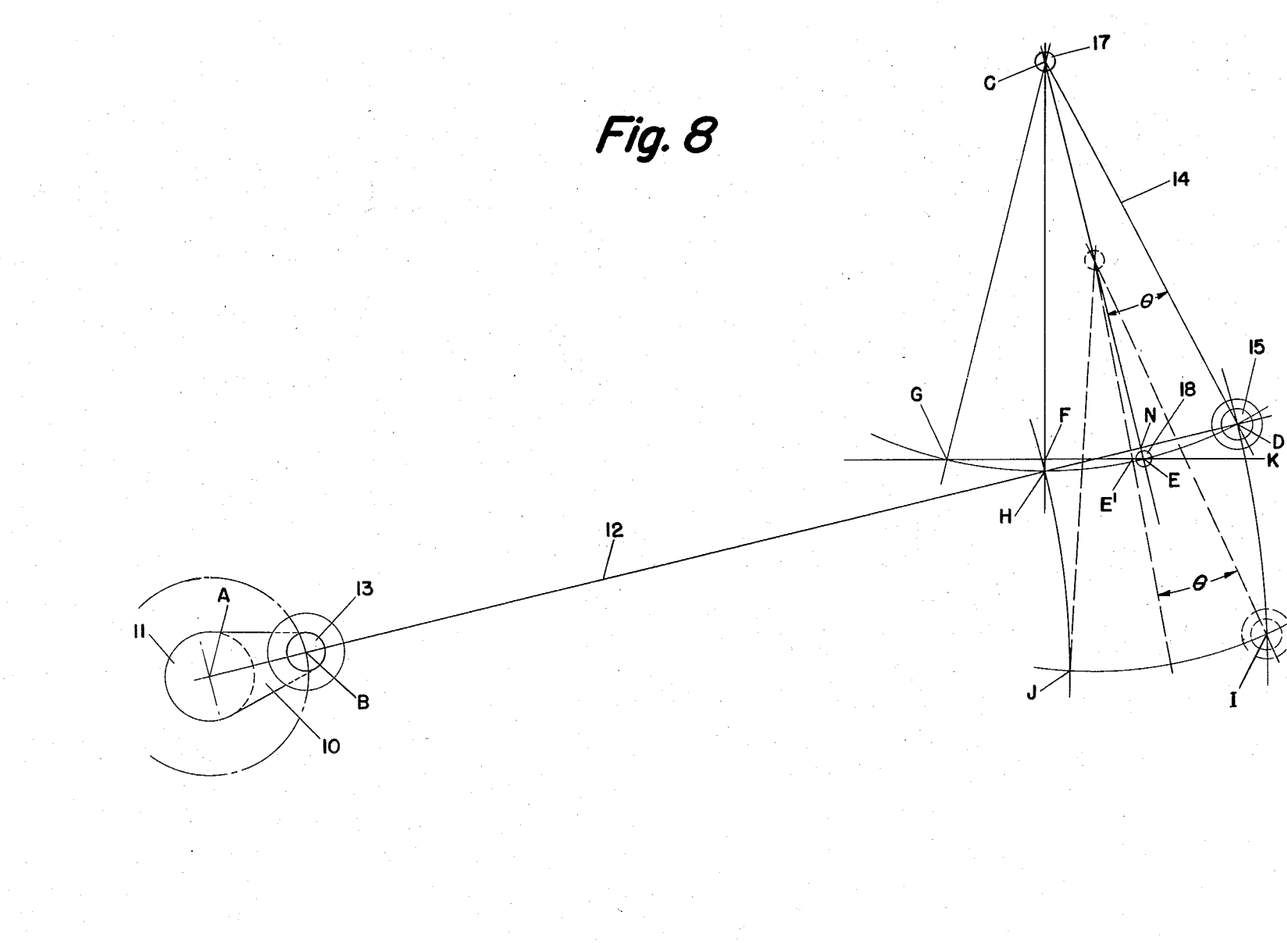
Figs. 8–9 schematically illustrate further modifications of the mechanism of Figs. 1–5.

The length of the swing box can, of course, vary between relatively wide limits depending upon the final requirements. However, in the present example (referring to Fig. 8), the vertical distance CF between the travel path of the plunger and the axis of pivot 17 will be taken as the same as in Figs. 6 and 7. Accordingly, the line CF will extend perpendicularly to the path of the plunger along line FK.

Since the stroke is to be two inches, points E and G are established one inch from F on the line FK and on opposite sides of the line CF. The line CE establishes the kinematic link between pivots 17 and 18 and corresponds with the position of rod or link 16 of Fig. 1. The line CE also establishes the path of adjustment of pivot 17 and of the swing box to change the stroke. The pivotal connection 15 will lie on the arc GHED and will be displaced in the direction of the plunger (located along EK) from E by the length of the chord ED.

Since the most favorable pressure angle is normally desired at maximum stroke, the kinematic driving link 12 will extend in a direction normal to line CE from the point of pivotal connection 15. Line DNH, normal to CE passes through point H. The position of kinematic link 14 has now been established between CD. The location of the center A along line DNHB may be selected as design requirements dictate. For purposes of comparison with Figs. 6 and 7, it is selected to be the same distance from D in Fig. 8 as in Figs. 6 and 7.

The diameter of the circle to be described by the crank 10 is equal to the distance HD (radius equal to HN=ND). Now that all significant dimensions have been ascertained, and setting the mechanism for ½ stroke (shown in broken lines), it will be seen the deviation EE' is less than in the modification of Fig. 6. It can be further reduced by lengthening the rod 12 or by following the design features of Fig. 7.

Figure 9:
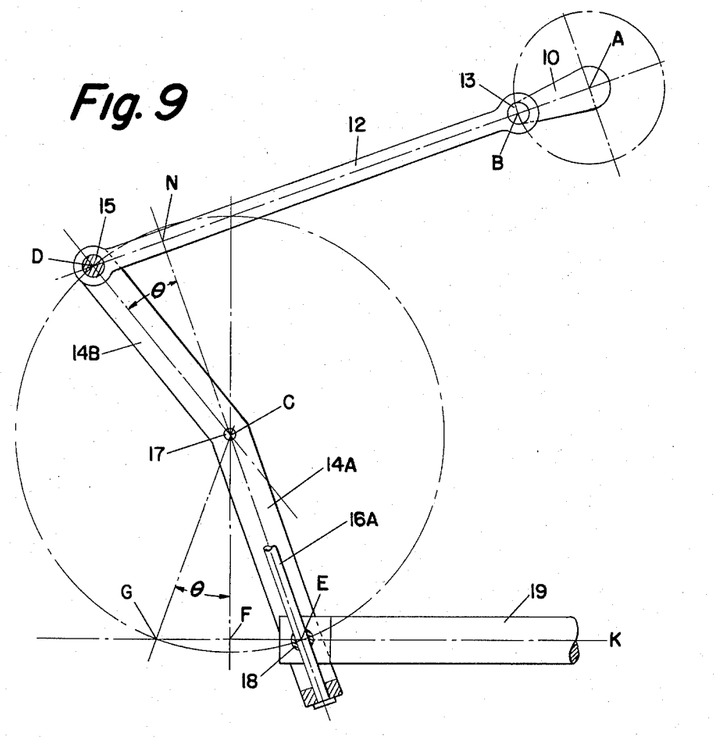

The modification of Fig. 9 illustrates additional flexibility of the design embodying the invention and in particular the manner in which the crank 10 rotating about the axis A may be located on the same side of the swing member 14A as the crosshead 19. The parts have been illustrated with the swing member 14A including the actuating rod 16A and plunger 19 in the forward position for full stroke. For shorter stroke lengths the pivotal connection 17 is moved downwardly from the illustrated position along a path marked by the line NCE and coinciding with the illustrated position of the swing member 14A.

It will be observed that the line ECN of the adjustment path of the pivotal connection 17 intersects the axis of the driving link 12 at the point N. That axis, the line ABND, is normal to the adjustment path NCE of pivotal connection 17. Thus, the geometry of the design is generally the same as the preceding modifications, though in Fig. 9 the actuating link 12 is pivotally connected at 15 to an extension 14B of the swing member 14A. By disposing the extension 14B at the same angle θ as in the preceding modifications, and particularly in Fig. 9, it will be seen that the swing member 14A has its pivotal connection 15 for one end of the driving link 12 located on the arc of a circle which extends through the points E and G of the intersection of the swing member (at the point E) with (a) the travel path of the crosshead 19 in its forward position, and (b) in its rearward position for said full stroke. The said pivotal connection 15 is displaced along said arc of the circle from the intersection therewith of the line of travel of the pivotal connection 17 by an angle θ. The angle θ is equal to the movement of the swing member 14A through equal-angles measured in each direction from a line CF perpendicular to the line GFK of travel of the crosshead and, of course, extending through said pivotal connection 17.

In accordance with the invention, the crank 10 may be located on one side of, as above, the travel path of the crosshead as shown in the earlier modifications, or it may be on the other side of the travel path of the crosshead, as below, as shown in Fig. 1; and it may be either on the same side of the pivotal connection 17 as the crosshead or on the opposite side. Moreover, there may be some deviation from the precise geometrical relationships which have been set forth. For example, the length of the crank 10 will not affect the angle θ which has been frequently referred to, i. e., Fig. 9, the angle between the line CN, which is colinear with the kinematic link between 17 and 18 with the plunger 19 in its forward position, and the line CD representing a second kinematic link to which the driving link is attached as at 15. While the normality of driving link 12 with the line CN, Fig. 9, or the line CNE of Fig. 6 will be preferred for a selected length of stroke, it is to be understood that if such normality does not appear for any selected stroke length, the principal advantages of the present invention may still be realized by having the normal relationship approached for a selected stroke length. For example, it can vary from the normal relationship by the same amount as it has been shown to vary as the stroke is changed from full stroke to zero stroke in the arrangement of Fig. 6.

What is claimed is:

1. In a variable stroke mechanism, the combination of a crosshead, a replaceable cylindrical bearing member rotatably carried by said crosshead and having an opening diametrically extending through said bearing member, an actuating rod slidably extending through said opening, the walls of which form a bearing surface for said rod, pivot means supporting one end of said rod and bodily movable to slide said rod relative to said bearing member, and driving means including a driving connection for reciprocating the other end of said rod to move said crosshead between selected forward and rearward positions.

2. A variable stroke mechanism comprising a crosshead to be reciprocated along a given travel path, said crosshead including a bearing member journaled therein and having an opening extending transversely therethrough, a swing member having an elongated element slidably mounted within said opening, pivotal means for said swing member, means adjustably carrying said pivotal means and constraining its line of adjustment along a path inclined at substantially the same angle as said elongated element when in one or the other of its limits of movement for a selected stroke-length of said crosshead, and driving means pivotally connected to said swing member and predetermining its said limit of movement for swinging it to and fro between said limits, the spacing between said pivotal means and said bearing member being adjustable by movement of said pivotal means along its said path of adjustment to vary the length of travel of said crosshead which for all positions of said pivotal connection and stroke-lengths has to a close approximation the same forward position, the rearward position of said crosshead varying from zero to a maximum relative to said forward position.

3. A variable stroke mechanism comprising a crosshead to be reciprocated along a given travel path, an intermediate swing member, supporting structure including a pivotal connection for said swing member, means adjustably carrying said supporting structure and constraining the line of adjustment of said pivotal connection along a path inclined at substantially the same angle as said swing member when in one or the other of its limits of movement for a selected stroke-length of said crosshead, a slidable driving connection between said crosshead and said swing member, and driving means pivotally connected to said swing member predetermining its said limits of movement and for swinging it to and fro between said limits, the spacing between said pivotal means and said slidable connection being adjustable to vary the length of travel of said crosshead.

4. A variable stroke mechanism comprising a crosshead to be reciprocated along a given travel path, an intermediate swing member, supporting structure including a pivotal connection for said swing member, means adjustably carrying said supporting structure and constraining its line of adjustment for movement of said pivotal connection along a path inclined at substantially the same angle as said swing member when in one or the other of its limits of movement for a selected stroke-length of said crosshead, a slidable driving connection between said crosshead and said swing member, a driving link pivotally connected to said swing member at a substantial distance from said pivotal connection and at a point laterally displaced from a line extending from said pivotal connection to said slidable driving connection, and a crank pivotally connected to the opposite end of said driving link for swinging said swing member to and fro between said limits of movement to reciprocate said crosshead, and means for bodily moving said supporting structure to vary the spacing between said pivotal connection and said slidable connection to change the length of travel of said crosshead, said crosshead for all positions of said pivotal connection relative to said slidable connection being actuated in one direction to approximately the same terminal point of said travel path, the shortening of said travel path with change in position of said pivotal connection relative to said slidable connection occurring by changing the position of the opposite terminal point of said travel path.

5. The mechanism of claim 4 in which said crank has its axis of rotation on a line normal to said path of adjustment.

6. The mechanism of claim 4 in which said crank has its axis of rotation located on a line extending in a direction normal to said line between said pivotal connection and said driving connection when said swing member is in its said forward position.

7. A variable stroke mechanism comprising a crosshead to be reciprocated along a given travel path, a swing member including an elongated rod, supporting structure including a pivotal connection for said swing member, means adjustably carrying said supporting structure and constraining the line of adjustment of said pivotal connection along a path inclined at substantially the same angle as said swing member when it is in a position corresponding with the forward position of said crosshead, a bearing member rotably carried by said crosshead and having an opening therethrough, said rod of said swing member being slidably mounted within said opening, and driving means pivotally connected to said swing member for swinging it to and fro, and means for bodily moving said supporting structure to vary the spacing between said pivotal connection and said slidable connection to change the length of travel of said crosshead when said swing member is swung to and fro between predetermined limits.

8. A variable stroke mechanism comprising a crosshead to be reciprocated along a given travel path, said crosshead having at one end a yoke, a bearing member pivotally mounted in said yoke and having an opening extending transversely therethrough, a swing member including a rod extending between opposite ends thereof and through said opening of said bearing member to form a slidable driving connection therewith, supporting structure including a pivotal connection for said swing member and including a yoke embracing said swing member, means adjustably carrying said supporting structure and constraining the line of adjustment of said pivotal connection along a path inclined at substantially the same angle as said swing member when in a position corresponding with the forward position of said crosshead for a stroke-length at least as great as half of full-stroke, means for bodily moving said supporting structure along said inclined path until the axis of said pivotal connection is disposed coaxially with the axis of said slidable driving connection for zero displacement of said crosshead, and driving means pivotally connected to said swing member at a point spaced a substantial distance from said pivotal connection and laterally of a line interconnecting the axes of said pivotal connection and said slidable driving connection for swinging said swing member to and fro, said means for bodily moving said structure being adjustable to vary the spacing between said pivotal connection and said slidable connection to predetermine the length of travel of said crosshead from the same forward position to different return positions thereof.

9. A variable stroke mechanism comprising a crosshead to be reciprocated along a given path, a swing member, supporting structure including a first pivotal connection for one end of said swing member, said swing member extending across the line of travel of said crosshead, a slidable and rotatable driving connection between said crosshead and said swing member for movement of said crosshead between a forward position and a rearward position, said swing member being movable through angles equal to each other as measured from a line perpendicular to the line of travel of said crosshead and extending through said pivotal connection when in a position midway of its forward and rearward positions for said full-stroke, stroke-adjusting means constraining said supporting structure for movement of said first pivotal connection along a fixed path substantially coinciding with the position of said swing member with said crosshead in its forward position for said full-stroke, a driving link, said swing member having a second pivotal connection for one end of said driving link located on the arc of a circle extending through the points of intersection of said swing member with (a) said travel path of said crosshead in its forward position and (b) in its rearward position for said full-stroke and being displaced along said arc through an angle equal to said equal angles, and means for reciprocating said driving link including crank means having its center of rotation located on a line extending from said second pivotal connection in a direction generally normal to said path of adjustment with said first pivotal connection constrained in a position for a selected length of stroke and with said second pivotal connection in the forward position for said selected length of stroke, and a third pivotal connection between said crank means and the end of said driving link remote from said second pivotal connection.

10. A variable stroke mechanism comprising a crosshead to be reciprocated along a given path, an intermediate swing member, supporting structure including a first pivotal connection for one end of said swing member, said swing member extending across the line of travel of said crosshead, a slidable and rotatable driving connection between said crosshead and said swing member for movement of said crosshead between a forward position and a rearward position, said swing member for full-stroke being movable through angles equal to each other as measured from a line perpendicular to the line of travel of said crosshead and extending through said pivotal connection when in a position midway of its forward and rearward positions for said full-stroke, stroke-adjusting means constraining said supporting structure for movement of said pivotal connection along a fixed path corresponding with the position of said swing member when said crosshead is in its forward position for said full-stroke, a driving link, said swing member having a second pivotal connection for one end of said driving link located on the arc of a circle extending through the points of intersection of said swing member with (a) said travel path of said crosshead in its forward position and (b) in its rearward position for said full-stroke and being displaced along said arc through an angle equal to aforesaid angles, and means for reciprocating said driving link including crank means having its axis of rotation located on a line generally normal to a line coinciding with said path of adjustment.

11. A variable stroke mechanism comprising a crosshead to be reciprocated along a given path, an intermediate swing member, supporting structure including a first pivotal connection for one end of said swing member, said swing member extending across the line of travel of said crosshead, a slidable and rotatable driving connection between said crosshead and said swing member for movement of said crosshead between a forward position and a rearward position, said swing member for full-stroke being movable through angles equal to each other as measured from a line perpendicular to the line of travel of said crosshead and extending through said pivotal connection when in a position midway of its forward and rearward positions for said full-stroke, stroke adjusting means constraining said supporting structure for movement of said pivotal connection along a fixed path corresponding with the position of said swing member when said crosshead is in its forward position for said full-stroke, a driving link, said swing member having a second pivotal connection for one end of said driving link located on the arc of a circle extending through the points of intersection of said swing member with (a) said travel path of said crosshead in its forward position and (b) in its rearward position for said full-stroke and being displaced along said arc through an angle equal to aforesaid angles, and means for reciprocating said driving link including crank means having an axis of rotation, said axis of rotation being located on a line extending rearwardly of said crosshead from said forward position of said second pivotal connection and normal to the forward position of said swing member for a selected operation between full-stroke and zero-stroke.

12. A variable stroke mechanism comprising a crosshead to be reciprocated along a given path, a swing member, supporting structure including a first pivotal connection for one end of said swing member, said swing member extending across the line of travel of said crosshead, a slidable and rotatable driving connection between said crosshead and said swing member for movement of said crosshead between a forward position and a rearward position, said swing member being movable through angles equal to each other as measured from a line perpendicular to the line of travel of said crosshead and extending through said pivotal connection when in a position midway of its forward and rearward positions for said full-stroke, stroke-adjusting means constraining said supporting structure for movement of said pivotal connection along a fixed path substantially coinciding with the position of said swing member with said crosshead in its forward position for a selected length of stroke, a driving link, said swing member having a second pivotal connection for one end of said driving link located on the arc of a circle which passes through the points of intersection of said swing member with said travel path of said crosshead when in its full forward position and when in its full rearward position for said full-stroke and being displaced along said arc in the direction of said crosshead through an angle equal to said equal angles, and means for reciprocating said driving link including crank means having a center of rotation, said center of rotation being located on a line extending from the axis of said second pivotal connection in a direction normal to the forward position, for a selected operation between full-stroke and zero-stroke, of a kinematic link interconnecting said first and said second pivotal connections.

13. A controlled volume pump comprising a plunger to be reciprocated within a plunger chamber, a crosshead movable along a path which forms an extension of the axis of the plunger chamber, a swing member, supporting structure including a first pivotal connection for one end of said swing member, said swing member having a driving element extending across the path of said crosshead, a bearing member rotatably carried by said crosshead and having an opening slidably to receive said driving element to form a driving connection between said crosshead and said swing member for movement of said crosshead between a forward position and a rearward position, said driving element being movable with said swing member through angles equal to each other as measured from a line perpendicular to said path of said crosshead and extending through said pivotal connection, said supporting structure including stroke-adjusting means constraining said supporting structure for movement of said first pivotal connection along a fixed path substantially coinciding with the position of said driving element with said crosshead in its forward position for said full-stroke, a driving link, said swing member having a second pivotal connection for one end of said driving link located on the arc of a circle which passes through the points of intersection of said swing member with said travel path of said crosshead when in its full forward position and when in its full rearward position for said full-stroke and being displaced along said arc in the direction of said crosshead by an angle equal to said equal angles, and crank means for reciprocating said driving link, said crank means having an axis of rotation located on a line extending from the axis of said second pivotal connection in a direction normal to the forward position, for a selected operation between full-stroke and zero-stroke, of a kinematic link interconnecting said first and second pivotal connections.

14. A variable stroke mechanism comprising a crosshead to be reciprocated along a given path, a swing member, supporting structure including a first pivotal connection for one end of said swing member, a slidable and rotatable driving connection between said crosshead and said swing member for movement of said crosshead between a forward position and a rearward position upon movement of said swing member about said first pivotal connection, stroke-adjusting means constraining said supporting structure for movement of said pivotal connection along a fixed path which extends in the same general direction as the kinematic link between said first pivotal connection and said slidable and rotatable connection when said kinematic link is in its forward position for a selected length of stroke, a driving link, said swing member having a second pivotal connection for one end of said driving link located on the arc of a circle having a center at said first pivotal connection and being displaced along said arc in the direction of the crosshead, and means for reciprocating said driving link including crank means having a center of rotation located on a plane extending from the axis of said second pivotal connection normal to the forward position of a line colinear with a kinematic link interconnecting the first and second pivotal structures.

15. A variable stroke mechanism comprising a crosshead to be reciprocated along a rectilinear path, a swing member having a pivotal and slidable driving connection with said crosshead and having a pivotal support movable along a stroke-adjusting path, a crank pivotally connected to said swing member for rotating it about its pivotal support between a forward angular position and a rearward angular position characterized by the fact that for full stroke a line extending from said pivotal support and normal to a line parallel to the path of said crosshead bisects the angle through which said swing member is moved by said crank, and means constraining said pivotal support for adjustment along a path substantially parallel to the position of said swing member when in a position corresponding with full forward stroke of said crosshead.

16. The variable stroke mechanism of claim 15 in which an actuating rod of substantial length interconnects said crank and said swing member and in which said actuating rod for the forward position of the plunger for a selected stroke length extends in a direction normal to said swing member and intersects the axis of rotation of said crank.

17. The variable stroke mechanism of claim 15 in which said actuating rod is pivotally connected to said swing member at a point on a line forming from the axis of said pivotal support and said stroke-adjusting path an angle half of that through which said swing member is moved by said crank.

References Cited in the file of this patent

UNITED STATES PATENTS

| | | |
|---|---|---|
| 678,172 | Grist | July 9, 1901 |
| 2,604,054 | Fitch | July 22, 1952 |